US012698710B2

(12) United States Patent
Chen et al.

(10) Patent No.: US 12,698,710 B2
(45) Date of Patent: Aug. 4, 2026

(54) PERFORMANCE MONITORING SYSTEM FOR DISC CUTTER OF TUNNEL BORING MACHINE

(71) Applicant: NK Photonics Ltd., Taipei (TW)

(72) Inventors: Nan-Kuang Chen, Taipei (TW); Si-Chi Chen, Taipei (TW); Hsuan-Yu Chen, Taipei (TW); Wan-Shan Tsao, Taipei (TW)

(73) Assignee: NK Photonics Ltd., Taipei (TW)

( * ) Notice: Subject to any disclaimer, the term of this patent is extended or adjusted under 35 U.S.C. 154(b) by 497 days.

(21) Appl. No.: 18/511,960

(22) Filed: Nov. 16, 2023

(65) Prior Publication Data

US 2024/0159147 A1     May 16, 2024

(30) Foreign Application Priority Data

Nov. 16, 2022    (CN) ......................... 202211434238.6

(51) Int. Cl.
*E21D 9/00* (2006.01)
*E21D 9/10* (2006.01)
*G01D 5/38* (2006.01)

(52) U.S. Cl.
CPC ............. *E21D 9/003* (2013.01); *E21D 9/104* (2013.01); *G01D 5/38* (2013.01)

(58) Field of Classification Search
CPC ........... E21D 9/003; E21D 9/104; G01D 5/38
See application file for complete search history.

(56) References Cited

U.S. PATENT DOCUMENTS

| | | | | |
|---|---|---|---|---|
| 4,189,183 | A | * | 2/1980 | Borowski ............. E21C 35/282 |
| | | | | 175/50 |
| 7,014,271 | B2 | * | 3/2006 | Burger .................. E21D 9/0879 |
| | | | | 299/1.8 |
| 8,172,334 | B2 | * | 5/2012 | Lindbergh .............. E21D 9/003 |
| | | | | 299/1.8 |

FOREIGN PATENT DOCUMENTS

| | | | | | |
|---|---|---|---|---|---|
| CN | 112177624 | A | * | 1/2021 | ............. E21F 17/00 |
| CN | 114754811 | A | * | 7/2022 | ............. G01D 21/02 |

* cited by examiner

*Primary Examiner* — Janine M Kreck
(74) *Attorney, Agent, or Firm* — Fish IP Law, LLP

(57) ABSTRACT

A performance monitoring system for a disc cutter of a tunnel boring machine (TBM) is provided, and includes a disc cutter body, a shaft assembly and an isolation boss; the shaft assembly includes a shaft main body and a bearing spacer located on the shaft main body; a rotating mechanism is arranged in a space between the isolation boss and the bearing spacer; the rotating mechanism includes a rotator and a T-shaped extension support located between the bearing spacer and the rotator; bearing retainers of roller bearings are arranged on two sides of the T-shaped extension support; a ring-shaped grating strip is arranged on one side of the rotator close to the T-shaped extension support; a connecting component is arranged on one side of the rotator away from a rotating bearing; and a sealing assembly is arranged between the T-shaped extension support and the rotator.

20 Claims, 12 Drawing Sheets

22

7

13-2

13-1

26

22

7

13-2

13-1

31

PERFORMANCE MONITORING SYSTEM FOR DISC CUTTER OF TUNNEL BORING MACHINE

CROSS-REFERENCE TO RELATED APPLICATION

This patent application claims the priority of Chinese Patent Application No. 202211434238.6 filed on Nov. 16, 2022, the disclosure of which is incorporated by reference herein in its entirety as part of the present application.

TECHNICAL FIELD

The present disclosure relates to a tunnel boring machine monitoring equipment, specifically a performance monitoring system for a disc cutter of a tunnel boring machine.

BACKGROUND

Tunnel boring machine (TBM) is a special engineering machine for tunneling. A modern TBM integrates optical, mechanical, electrical, hydraulic, sensing and information technologies, has functions of excavating and cutting soil, transporting slag, assembling tunnel linings, correcting measuring guide and the like, and involves many disciplines, such as geology, civil engineering, mechanical engineering, mechanics, hydraulics, electric engineering, control and measurement. Moreover, TBMs shall be designed and manufactured according to different geological conditions and actual circumstances, which poses an extremely high requirement on reliability. TBMs have been widely used in tunnel engineering such as subways, railways, highways, municipal engineering, and hydropower.

Many disc cutters are mounted on the TBM. In the prior art, a method for detecting the performance of the disc cutter is to inlay eight magnets into an outer ring of the disc cutter and mount a magnetic field detector inside the disc cutter barrel. When the disc cutter rotates, its rotating speed can be measured by the magnetic field detector. However, this method comes along with the following disadvantages:

(1) Rock fragments or soil will scratch or damage surfaces of the magnet and the disc cutter. Thus, a distance between each magnet and the magnetic field detector gradually increases, the magnetic field is greatly weakened, and the accuracy of measurement is reduced.

(2) When the iron element exists in the rock fragments or soil, which will be attracted and attached to the magnets so that the magnetic field is somehow shielded, resulting in a reduced the accuracy of measurement.

(3) The inlaid magnets may deform, be scratched or drop out due to the impact of the rock.

(4) The magnetic forces of the inlaid magnets may decrease due to an increased temperature of the disc cutter caused by friction with rocks or soil for a long-time, which directly results in the distortion of detection.

(5) When the rotating speeds of the disc cutters are different, the working temperature will increase or decrease due to different frictions or geological conditions (for example, rock and water appear alternately), which will cause the intensity of the magnetic field to change accordingly and affect the monitoring accuracy of the magnetic field.

(6) Changes of geological hardness for a contact point of the rock or soil with the front end of the disc cutter or a geological interface of the rock or soil contacting with the front end of the disc cutter cannot be monitored and recorded.

(7) A rotating direction of the disc cutter cannot be measured.

(8) A rotating acceleration of the disc cutter cannot be measured.

(9) A vibration frequency of the disc cutter cannot be measured.

Therefore, it is urgently desired to provide a system which can automatically monitor performance parameters of the TBM disc cutter, such as the absolute rotating position, the rotating direction, the rotating speed and the working temperature of the disc cutter, without changing the original mechanical structure of the TBM disc cutter, so as to avoid the serious wear of the disc cutter that may damage the cutterhead.

SUMMARY

The technical task of the present disclosure is to provide a performance monitoring system for a disc cutter of a tunnel boring machine (TBM) to solve the problem below: without changing the original mechanical structure of a disc cutter of a TBM, how to automatically monitor an absolute rotating position of the disc cutter of the TBM, the rotating direction of the disc cutter, the rotating speed of the disc cutter, the temperature of the disc cutter and other real-time working parameters to avoid destroying of neighboring disc cutters or the cutterhead due to severe damages of a certain disc cutter.

The technical task of the present disclosure is implemented by the following method. A performance monitoring system for a disc cutter of the TBM includes an optical transceiver, a temperature sensor, a disc cutter body, a shaft assembly and an isolation boss; the shaft assembly includes a shaft main body and a bearing spacer located on the shaft main body; a rotating mechanism is arranged in a space between the isolation boss and the bearing spacer;

the rotating mechanism includes a rotator and a T-shaped extension support located between the bearing spacer and the rotator; bearing retainers of the roller bearings are located on two sides of the T-shaped extension support; a ring-shaped grating strip is arranged on a side of the rotator close to the T-shaped extension support; the isolation boss is arranged on one side of the rotator away from the shaft assembly, along a radial direction of the rotator; the isolation boss is linked with the rotator; a sealing assembly is arranged between the T-shaped extension support and the rotator at bilateral sides of the rotator;

a bearing spacer hole is formed in the bearing spacer and has transmitting and receiving optical fibers connected with the optical transceiver and a probe of the temperature sensor arranged therein; when the disc cutter body rotates, the grating strip is driven to rotate by the isolation boss to chop a light beam emitted from the transmitting optical fibers embedded in the T-shaped extension support based on relative motion relationship between the bearing spacer and the isolation boss;

the light beam is reflected back to the receiving optical fibers by non-hollowed portion of the grating strip and then transmitted to the optical transceiver at exterior, to acquire a pulsed signal with a positioning feature, and in turn obtain a rotating speed, a rotating direction, an angular acceleration and a vibration frequency of the disc cutter.

In some embodiment, the positioning feature is angular position.

In some embodiments, a pipeline passage hole is formed in the shaft main body; the pipeline passage hole is communicated with the bearing spacer hole; and has the optical fibers, an electronic signal line and a power line mounted therein; the temperature sensor sends data to a server through the electronic signal line; the optical transceiver sends data to the server through the optical fibers; and the power line is electrically connected with the temperature sensor for supplying power to the temperature sensor.

In some embodiments, the system further includes a disc cutter box, and a power generation mechanism is arranged in the disc cutter box.

In some embodiments, the power generation mechanism includes a disk generator and a geared power generation mechanism; the geared power generation mechanism includes a power generation transmission gear and a power generation speed increasing gear; a disc cutter body transmission gear is arranged on the disc cutter body; the power generation transmission gear is engaged with the disc cutter body transmission gear and the power generation speed increasing gear; the power generation speed increasing gear is connected to an input end of the disk generator; the disk generator is electrically connected with a rechargeable battery through a rectifying and voltage stabilizing circuit; the rechargeable battery is electrically connected with the temperature sensor and the optical transceiver through the power line; and the optical transceiver is arranged in the disc cutter box.

In some embodiments, the power generation mechanism is arranged on a rear side of a rotating cutterhead; the power generation mechanism includes a disk generator and a geared power generation mechanism; the geared power generation mechanism includes a power generation transmission gear and a power generation speed increasing gear; a gear ring is arranged on an outer race of the rotating bearing where the rotating cutterhead is connected with an excavation chamber; the power generation transmission gear is engaged with the gear ring and the power generation speed increasing gear respectively; the power generation speed increasing gear is connected to an input end of the disk generator; the disk generator is electrically connected with a rechargeable battery through a rectifying and voltage stabilizing circuit; the rechargeable battery is connected with the temperature sensor and the optical transceivers through the power line; and the optical transceiver is arranged at back of the rotating cutterhead.

In some embodiments, the gear ring is arranged on the outer race of the rotating bearing where the rotating cutterhead is connected with a rotating structure of the excavation chamber.

In some embodiments, the rotating cutterhead and a rotating cutterhead holder are welded with a sealed steel tube channel; the optical fiber and a cable are arranged below the disc cutter; a signal in the optical fiber and the cable is led to a position on the rear side of the rotating cutterhead close to the excavation chamber along the sealed steel tube channel, and a signal in the optical fibers is converted into a wireless signal for transmission; the wireless signal is then received at a rear part of the excavation chamber, and is converted into a wired signal and sent to the server for data processing.

In some embodiments, multiple grating holes are arranged on the ring-shaped grating strip; the rotating speed of the disc cutter body is acquired periodically according to a distance between adjacent grating holes and a cycle of a reflected light signal with intensity modulated by the ring-shaped grating strip; a rotating acceleration is then acquired according to a variation of the rotating speed of the disc cutter body with respect to time; and a vibration frequency signal is obtained by deriving Fourier transformation on the pulsed light signal over time.

In some embodiments, the grating holes are distributed along the grating strip, and the grating holes are arranged with an equal interval and an equal length.

In some embodiment, the multiple grating holes are distributed along the ring-shaped grating strip; lengths of the grating holes are respectively d1, d2, . . . , dn, that is, the lengths of all grating holes are different; a distance from an upper edge of any grating hole to an upper edge of an adjacent grating hole is equal, which is p1; a reference grating with a fixed length is arranged on one side of each grating hole; the lengths of all reference gratings are all equal, which are p2, and a calculation formula of a duty cycle sn is as follows:

$$sn = \frac{p2 - dn}{p2};$$

A cycle is monitored by the optical transceiver, and compared with a cycle of the reference gratings; a real-time absolute rotating position of the disc cutter is monitored in combination with the duty cycle; and an accurate rotating angle of the disc cutter is acquired by using the reference grating as a comparison reference, and the reference grating adopts a reference grating hole or a light reflection surface or a light diffusion surface or a scattering surface.

In some embodiments, the grating holes are periodically distributed along the ring-shaped grating strip, specifically as follows:

multiple large-cycle grating units with unequal distances are arranged on the ring-shaped grating strip; lengths of the large-cycle grating units are respectively D1, D2, . . . , Dn; different number of small-cycle grating holes are respectively arranged in each large-cycle grating unit; lengths of the small-cycle grating holes are respectively d1, d2, . . . , dn; the small-cycle grating holes are attached in the large-cycle grating units; and the optical transceiver acquires an accurate rotating position and the rotating direction by comparing and analyzing a ratio of the large-cycle grating units to the small-cycle grating holes.

In some embodiments, multiple filters with an equal length are arranged on the ring-shaped grating strip; the filters are uniformly distributed along the ring-shaped grating strip; and the optical transceiver monitors a real-time absolute rotating position of the disc cutter according to a change of wavelengths of the filters.

In some embodiments, multiple polarizers are arranged on the ring-shaped grating strip; the polarizers are uniformly distributed along the ring-shaped grating strip and have a same size; and the optical transceiver monitors a real-time absolute rotating position of the disc cutter according to a change of polarizing angles of the polarizers.

In some embodiments, multiple diffraction lenses are arranged on the ring-shaped grating strip; the diffraction lenses are provided with different patterns; and the optical transceiver monitors the real-time absolute rotating position of the disc cutter according to the patterns on the diffraction lenses.

In some embodiments, a transmitting optical fiber and a receiving optical fiber are mounted on the same side of the ring-shaped grating strip.

In some embodiments, focusing lenses are respectively arranged on ends, close to the ring-shaped grating strip, of the transmitting optical fiber and the receiving optical fiber.

In some embodiments, the focusing lenses adopt dispersive fiber circular focusing lenses (RGB) to focus light with different wavelengths at different positions, so as to improve the detection accuracy of the ring-shaped grating strip and avoid influence caused by relative vibrations of parts in a pipeline;

> the dispersive fiber circular focusing lenses allow light beams with different wavelengths to pass therethrough by means of coating, material absorption, a waveguide structure thickness, Numerical Aperture (NA) value change or micro cavity interference; when the receiving optical fiber and the transmitting optical fiber in the disc cutter body move relative to the ring-shaped grating strip due to an external vibration, a transmitting point transmits light with different wavelengths back to the receiving optical fiber and the transmitting optical fiber, and the rotating speed and the vibration of the disc cutter are calculated.

In some embodiments, the receiving optical fiber adopts an NA-gradient multi-beam fiber; and the NA-gradient multi-beam fiber refers to a multi-beam fiber in which an NA value increases or decreases gradually ring by ring along an outward radial direction of a light propagation direction, that is, the NA-gradient multi-beam fiber means that for a plurality of parallel optical fibers, NA value of an optical fiber on an outer ring is greater than that of an optical fiber on an inner ring.

In some embodiments, the NA-gradient multi-beam fiber includes an optical fiber with a wavelength of $\lambda_1$, an optical fiber with a wavelength of $\lambda_2$, and an optical fiber with a wavelength of $\lambda_3$ from inside to outside, $\lambda_1 > \lambda_2 > \lambda_3$.

Specifically, the NA-gradient multi-beam fiber includes an optical fiber for transmitting red light, an optical fiber for transmitting green light and an optical fiber for transmitting blue light from inside to outside. The NA of the optical fiber for transmitting red light located in the center is the smallest, which is relatively close to that of parallel light. The NA of the optical fiber for transmitting green light is intermediate. The NA of the optical fiber for transmitting blue light is the largest. The larger the NA value, the larger the divergence angle of the optical fiber, and the shorter the focal length after focusing. Therefore, red light, green light and blue light are respectively launched into the optical fiber for transmitting red light, the optical fiber for transmitting green light and the optical fiber for transmitting blue light, so that the light with different wavelengths are focused at different focal points, and the rotating speed and vibration of the disc cutter body are calculated.

In some embodiments, a connecting component is arranged between the rotator and the isolation boss for fixedly connecting the rotator and the isolation boss.

In some embodiments, the connecting component adopts a connecting fixed rod or a spring pin.

In some embodiments, the rotator is in tight fit with the isolation boss or a bearing end cover; and the bearing spacer is in fit with a bearing inner race.

In some embodiments, the sealing assembly adopts a left seal and a right seal assemble or a left bearing and a right bearing. The left seal assemble and the right seal assemble are both rubber seal assembles.

The performance monitoring system for the disc cutter of the TBM of the present disclosure has the following advantages:

(1 In the present disclosure, the optical transceiver of the optical sensor is fixed in the bearing spacer hole according to the relative motion relationship between the bearing spacer (which does not rotate, neither does the shaft assembly) and the isolation boss (which is a protrusion ring inside the disc cutter body and used to isolate two roller bearings) inside the disc cutter. While the ring-shaped grating strip with a black-and-white grating effect is fixed on the rotator; and the rotator is linked with the isolation boss through a mechanical structure. When the disc cutter body rotates, the isolation boss on the disc cutter body drives the ring-shaped grating strip to rotate to chop a conductive light beam in the optical transceiver fiber on the bearing spacer to obtain a pulsed signal with a positioning feature, thereby acquiring a rotating speed, a rotating direction, an angular acceleration and a vibration frequency of the disc cutter, ensuring that the performance parameters of the disc cutter can be timely acquired, and determining whether the disc cutter is worn in time, which is convenient to replace the disc cutter in time.

(2) Each element of the ring-shaped grating strip of the present disclosure carries a unique optical feature, which is different from that of other elements, so that the ring-shaped grating strip has a determining function for the rotating direction and the absolute position.

(3) The system of the present disclosure is deeply embedded in the center of the disc cutter, which obtains good mechanical protection and avoids contact with external rock and soil, thereby avoiding the impact on the detection accuracy due to destroying or damage.

(4) A temperature sensor is added on the bearing spacer of the present disclosure to monitor an internal temperature of the disc cutter. When the temperature rises more than 120° C., it means that the disc cutter does not rotate. Furthermore, grease in the disc cutter will lose its lubrication and damage the disc cutter due to the high temperature caused by friction with the rock. Therefore, information of rotation of the disc cutter can be acquired in time through the temperature sensor.

(5) In the present disclosure, the rotating direction, the rotating speed and the angular acceleration of the disc cutter are monitored through the ring-shaped grating strip, and are all transmitted to the outside of the disc cutter along the shaft via the optical fiber or electronic signal line in real time, and transmitted to the server via a wireless transceiver module. After data analyses and calculations, the change of 3D geological structure is recorded, and then a geological distribution in front of the disc cutter is predicted in advance.

(6) In the present disclosure, the real-time absolute rotating position of the disc cutter can be acquired through the ring-shaped grating strip.

(7) In the present disclosure, the power generation mechanism is arranged at the position, close to the excavation chamber, on the rear side of the rotating cutterhead, and the optical fiber is arranged along a sealed steel tube on the rotating cutterhead holder, so that information transmission between the excavation chamber and the disc cutter will not be affected by geological conditions. The power generation mechanism is arranged near the rotating bearing where the rotating cutterhead is connected with the excavation chamber, so that the space is large enough to install a large-size generator for high-efficiency power generation. The wireless transceiver modules are respectively located at front and rear ends of the rotating bearing where the rotating cutterhead is connected with the excavation chamber, with an extremely short distance, which can prevent the wireless signal from being attenuated by soil or rock.

Therefore, the present disclosure features with reasonable design, simple structure, easy machining, small volume, convenient use, multifunctionality and the like, and therefore, has good popularization and use value.

BRIEF DESCRIPTION OF THE DRAWINGS

The present disclosure is further described below in combination with accompanying drawings.

Figure 1:
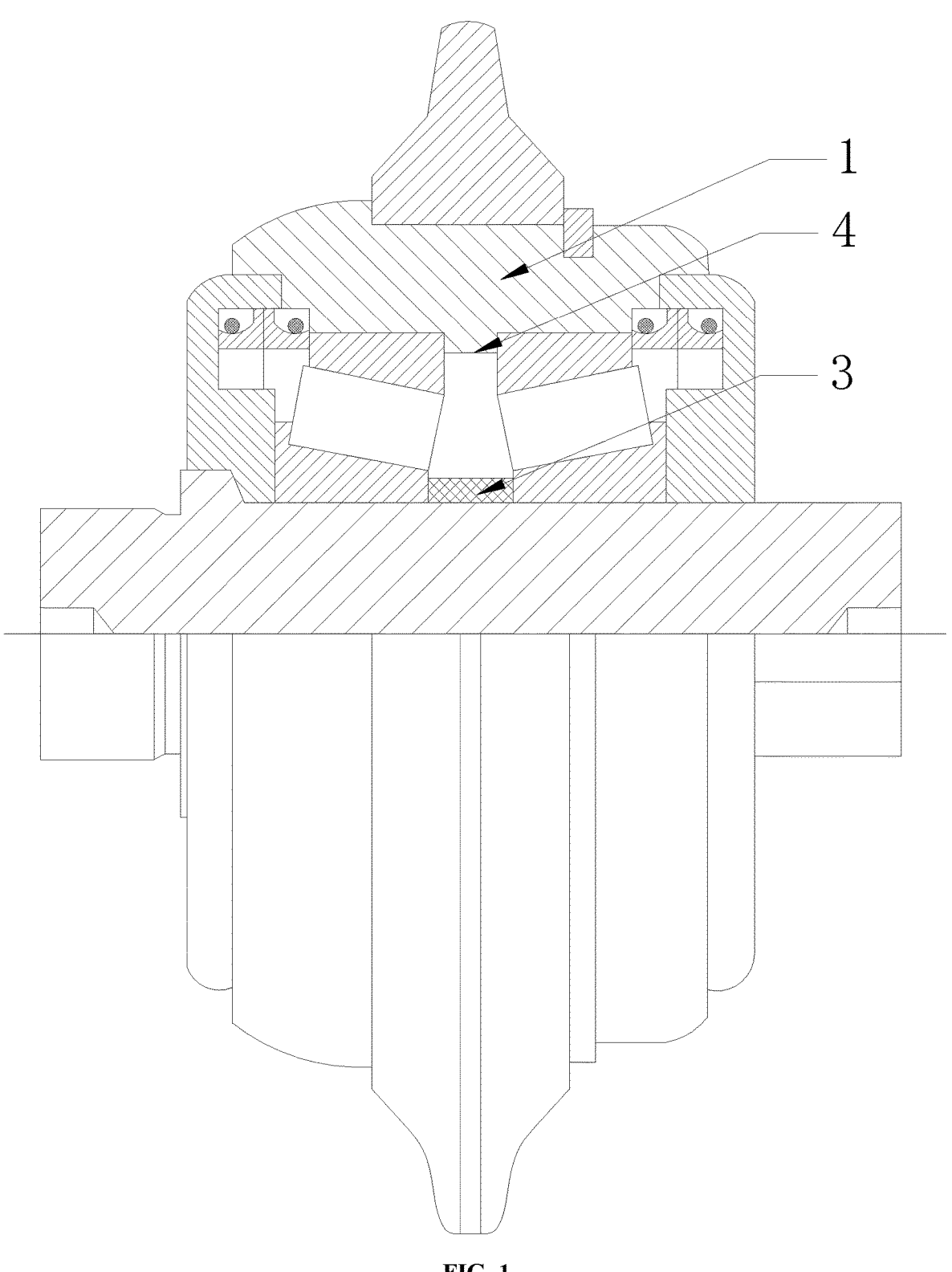
FIG. 1 is a schematic structural diagram of a disc cutter of a TBM.

Reference numerals: 1. disc cutter body, 2. shaft main body, 3. bearing spacer, 4. isolation boss, 5. rotator, 6. T-shaped extension support, 7. ring-shaped grating strip, 8. connecting component, 9. bearing spacer hole, 10. optical transceiver, 11. temperature sensor, 12. pipeline passage hole, 13. optical fiber, 13-1. transmitting optical fiber, 13-2. receiving optical fiber, 14. electronic signal line, 15. power line, 16. disc cutter box, 17. disc generator, 18. power generation transmission gear, 19. power generation speed-increasing gear, 20. disc cutter body transmission gear, 21. rechargeable battery, 22. grating hole, 23. filter, 24. polarizer, 25. diffraction lens, 26. reference grating, 27. large-cycle grating unit, 28. small-cycle grating hole, 29. outer race of a rotating bearing where the rotating cutterhead is connected with the excavation chamber, 30. bearing retainer,

8

31. focusing lens, 32. NA-gradient multi-beam fiber, 33. left seal assemble, 34. right seal assemble, 35. rectifying and voltage stabilizing circuit, 36. bearing end cover, 37. bearing inner race, and 38. gear ring.

DETAILED DESCRIPTION OF THE EMBODIMENTS

A performance monitoring system for a disc cutter of a TBM of the present disclosure is described below in detail with reference to the accompanying drawings of the specification and specific embodiments.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

In the description of the present disclosure, it should be understood that orientations or positional relationships indicated by the terms "upper", "lower", "front", "rear", "left", "right", "vertical", "horizontal", "top", "bottom", "inside", "outside" and the like are orientations or positional relationships as shown in the drawings, and are only for the purpose of facilitating and simplifying the description of the present disclosure, instead of indicating or implying the device or element indicated has to have specific orientations and be constructed and operated in specific orientations. Therefore, they cannot be understood as limitations to the present disclosure. In addition, the terms "first", "second" and "third" are only for the purpose of description, and may not be understood as indicating or implying the relative importance.

In the description of the present disclosure, it should be also noted that unless otherwise explicitly defined and defined, the terms "mounted", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

Embodiment 1

Figure 2:
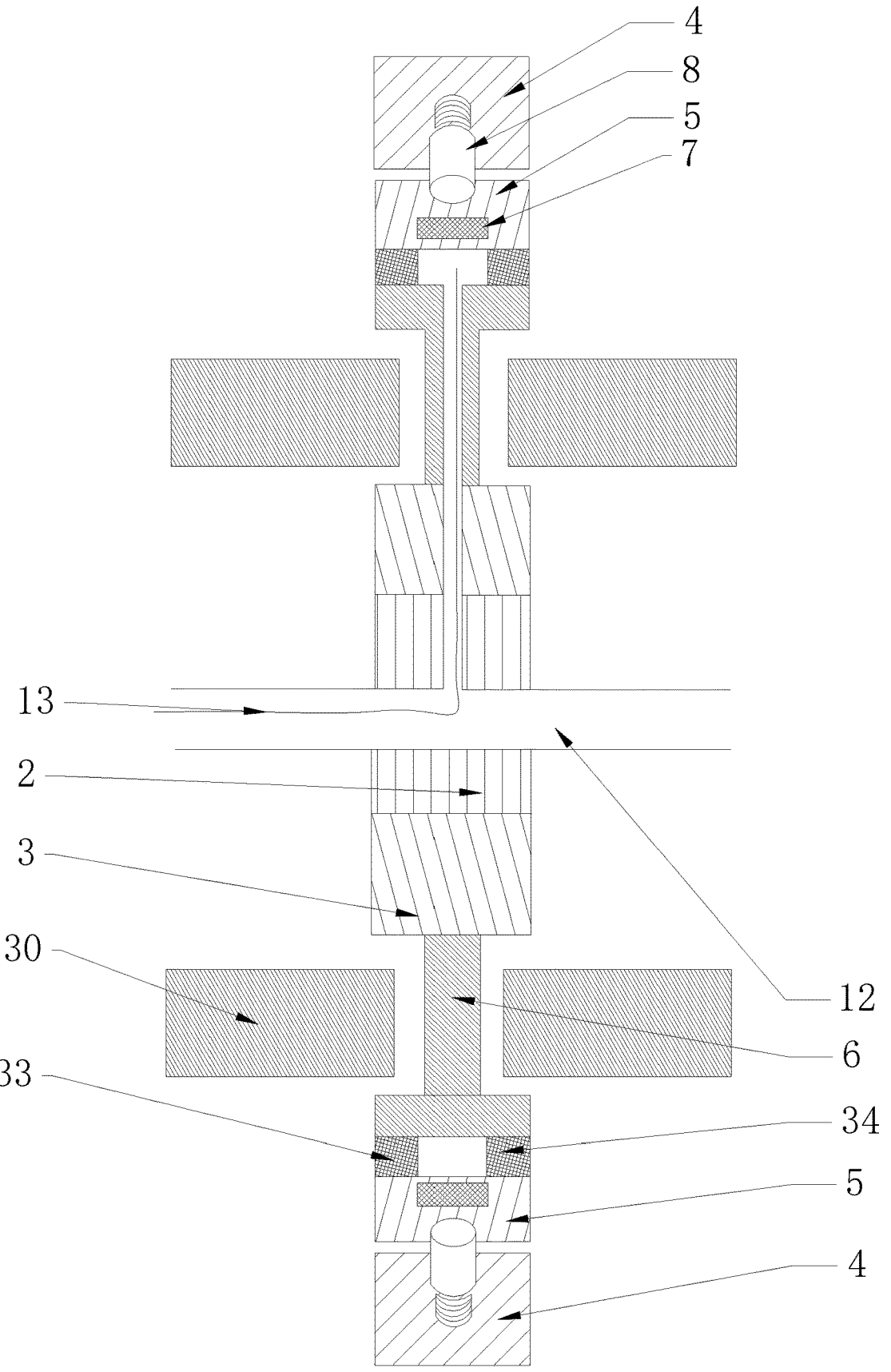
FIG. 2 is a schematic structural diagram of a performance monitoring system for a disc cutter of a TBM.

As shown in FIG. 1 and FIG. 2, a performance monitoring system for a disc cutter of a TBM of the present disclosure includes an optical transceiver 10, a temperature sensor 11, a disc cutter body 1, a shaft assembly and an isolation boss 4. The shaft assembly includes a shaft main body 2 and a bearing spacer 3 located on the shaft main body 2. A rotating mechanism is arranged in a space between the isolation boss 4 and the bearing spacer 3. The rotating mechanism includes a rotator 5 and a T-shaped extension support 6. The T-shaped extension support 6 is located between the bearing spacer 3 and the rotator 5. Bearing retainers 30 of roller bearings are arranged on two sides of the T-shaped extension support 6. The T-shaped extension support is a device to extend the rotator comprising a ring-shaped grating strip toward a suitable position beyond the very limited space formed by the bearing spacer and the bearing retainers of the roller bearings. The ring-shaped grating strip 7 is mounted on one side of the rotator 5 close to the T-shaped extension support 6. A transmitting optical fiber 13-1 and a receiving optical fiber 13-2 are mounted on the same side of the ring-shaped grating strip 7. The transmitting optical fiber 13-1 and the receiving optical fiber 13-2 can be combined in the same optical fiber 13 to realize the function of transmitting and receiving the light. The isolation boss 4 is arranged on one side of the rotator 5 away from the shaft assembly. The isolation boss 4 is linked with the rotator 5. A sealing assembly is mounted between the T-shaped extension support 6 and the rotator 5 at bilateral sides of the rotator. A connecting component 8 is mounted on one side of the rotator 5 away from the T-shaped extension support. One end of the connecting component 8 is fixedly connected with the rotator 5, and the other end of the connecting component 8 is fixedly connected with the isolation boss 4. The connecting component 8 adopts a spring pin.

Figure 3:
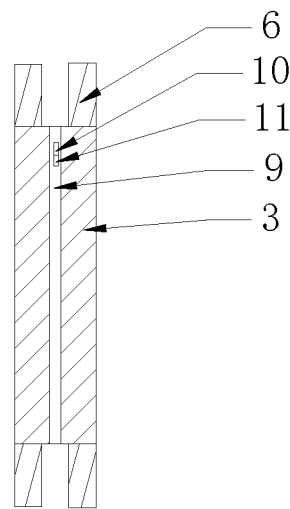
FIG. 3 is a schematic diagram of mounting of a bearing spacer and a rotator.

As shown in FIG. 3, a bearing spacer hole 9 is formed in the bearing spacer 3 in this embodiment. The transmitting and receiving optical fibers connected with the optical transceiver 10 and a probe of the temperature sensor 11 are mounted in the bearing spacer hole 9. When the disc cutter body 1 rotates, the ring-shaped grating strip 7 is driven to rotate by the isolation boss 4 to chop a light beam emitted from the optical fibers embedded in the T-shaped extension support 6 based on relative motion relationship between the bearing spacer and the isolation boss. The light beam is reflected back to the optical fiber by non-hollowed portion of the ring-shaped grating strip 7 and then transmitted to the optical transceiver 10 at exterior to acquire a pulsed signal with a positioning feature, and in turn obtain a rotating speed, a rotating direction, an angular acceleration and a vibration frequency of the disc cutter body 1.

Figure 4:
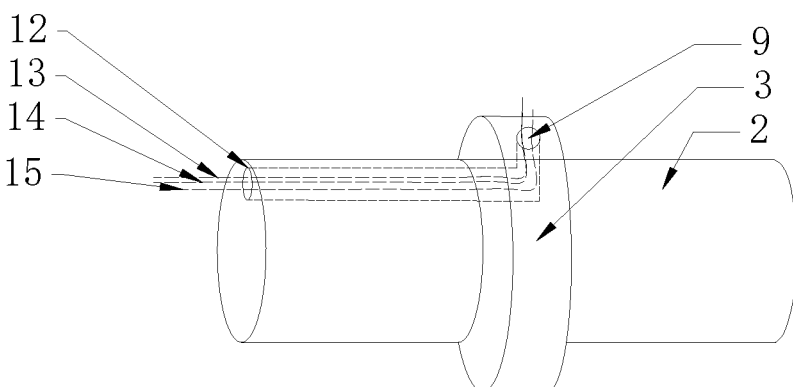
FIG. 4 is a schematic structural diagram of a shaft main body.
Figure 5:
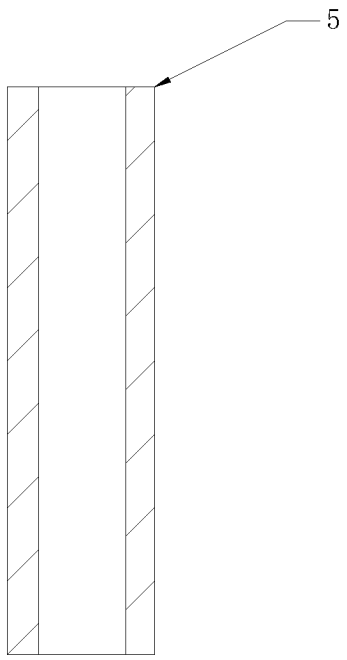
FIG. 5 is a schematic structural diagram of a rotator.

As shown in FIG. 4, a pipeline passage hole 12 is formed in the shaft main body 2 in this embodiment. The pipeline passage hole 12 is communicated with the bearing spacer hole 9. The optical fiber 13, an electronic signal line 14 and a power line 15 are mounted in the pipeline passage hole 12. The temperature sensor 11 sends data to a server through the electronic signal line 14. The optical transceiver 10 sends data to the server through the optical fibers 13. The power line 15 is electrically connected with the temperature sensor 11 for supplying power to the temperature sensor.

Figure 6:
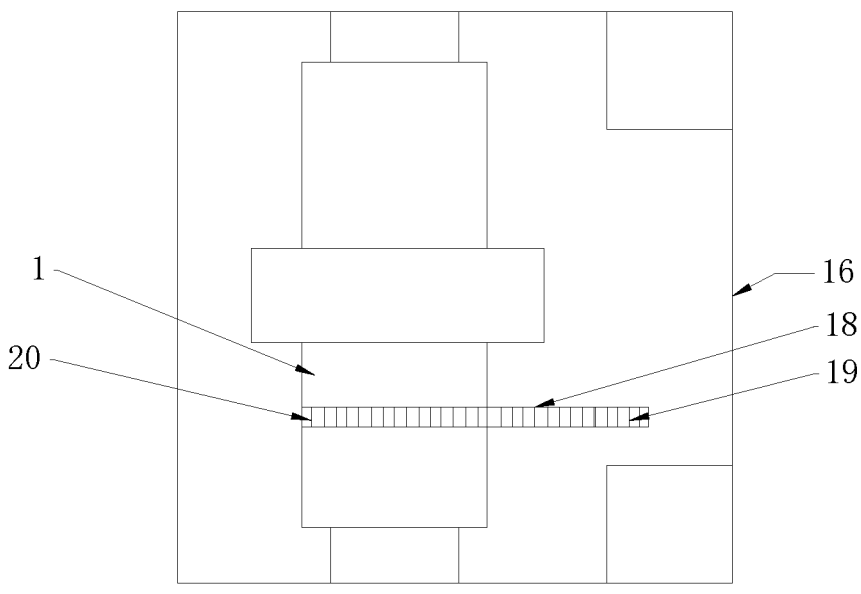
FIG. 6 is a schematic structural diagram of a disc cutter box.

As shown in FIG. 6, in this embodiment, a disc cutter box 16 is further included. A power generation mechanism and the optical transceiver are arranged in the disc cutter box. The power generation mechanism includes a disk generator 17 and a geared power generation mechanism. The geared power generation mechanism includes a power generation transmission gear 18 and a power generation speed increasing gear 19. A disc cutter body transmission gear 20 is mounted on the disc cutter body 1. The power generation transmission gear 18 is engaged with the disc cutter body transmission gear 20 and the power generation speed increasing gear 19. The power generation speed increasing gear 19 is connected to an input end of the disk generator 17. The disk generator 17 is electrically connected with a rechargeable battery 21 through a rectifying and voltage stabilizing circuit 35. The rechargeable battery 21 is electrically connected with the temperature sensor 11 and the optical transceiver 10 through the power line 15. The optical transceiver 10 is mounted in the disc cutter box 16.

Embodiment 2

A difference between this embodiment and Embodiment 1 only lies in that, multiple grating holes 22 are formed in the ring-shaped grating strip 7. A rotating speed of the disc cutter body 1 is acquired according to a distance between adjacent grating holes 22 and a time interval between the incident light and the reflected light, and a rotating acceleration is then acquired according to variation of the rotating speed of the disc cutter body 1 with respect to time; and a vibration frequency signal is obtained by deriving Fourier transformation on the pulsed light signal over time. Other structures, connection relationships and positional relationships are all the same as those in Embodiment 1.

Figure 7:
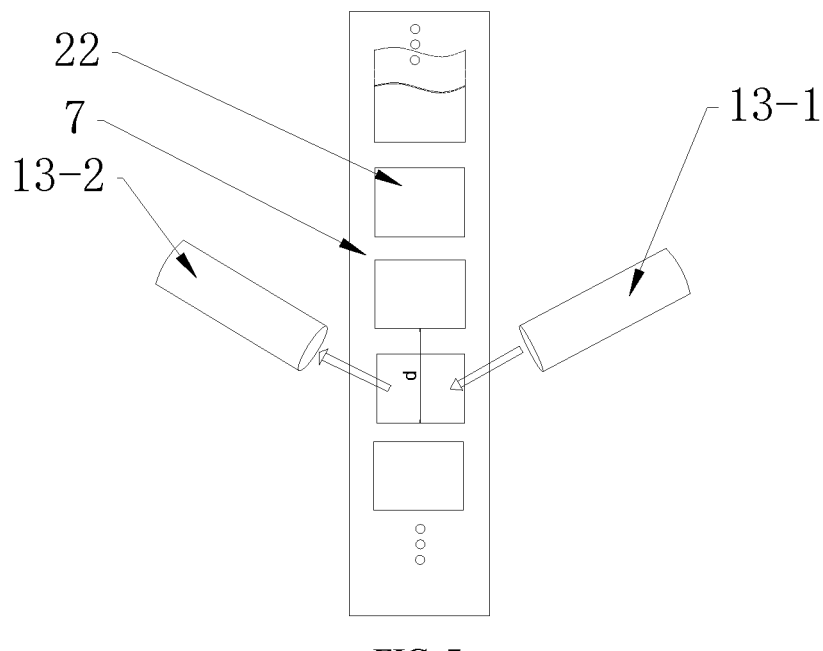
FIG. 7 is a schematic diagram of a radial arrangement of a ring-shaped grating strip.

As shown in FIG. 7, the grating holes 22 are radially distributed along the ring-shaped grating strip 7, and are arranged with an equal interval and an equal length.

A waveform of a modulated electronic signal received by the optical transceiver 10 is as follows.

if for one complete cycle, a hole interval is d and a time interval is t, the rotating speed is d/t.

When the speed changes, an acceleration is obtained by differentiating a speed curve with respect to time ($\Delta d/\Delta t$).

When the Fourier transformation is derived on the time according to the pulsed light signal, the vibration frequency signal can be obtained.

Embodiment 3

Figure 8:
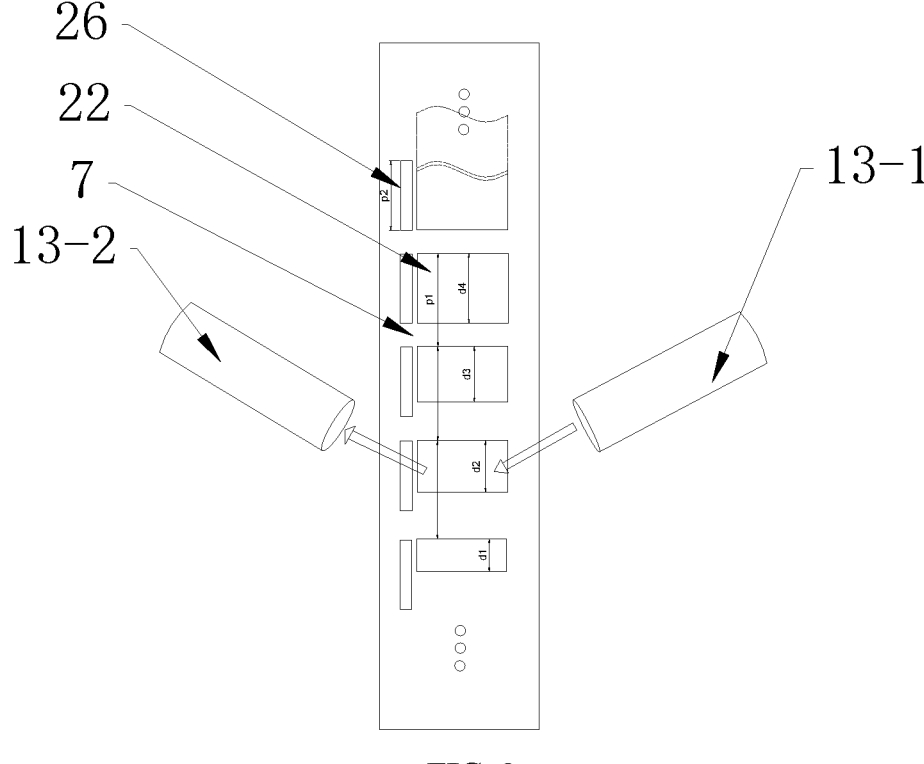
FIG. 8 is a schematic diagram of a ring-shaped grating strip with a gradually changing duty cycle.

A difference between this embodiment and Embodiment 2 only lies in that, as shown in FIG. 8, multiple grating holes 22 are distributed along the ring-shaped grating strip 7. Lengths of the grating holes 22 are respectively d1, d2, . . . , dn, that is, all the grating holes 22 are different in length. A distance between an upper edge of any grating hole 22 and an upper edge of an adjacent next grating hole 22 is equal, which is p1. A reference grating 26 with a fixed length is arranged on one side of the grating hole 22. The lengths of the reference gratings 26 are all equal, which are p2, so that a calculation formula of a duty cycle sn is as follows:

$$sn = \frac{p2 - dn}{p2};$$

A cycle is monitored through the optical transceiver 10, and is then compared with that of the reference gratings 26. A real-time absolute rotating position of the disc cutter is monitored in combination with the duty cycle. Furthermore, the reference grating 26 is used as a comparison reference to acquire an accurate rotating angle of the disc cutter. The reference grating 26 adopts a reference grating hole or a light reflection surface or a light diffusion surface or a scattering surface. Other structures, connection relationships and positional relationships are all the same as those in Embodiment 2.

For example, the entire ring-shaped grating strip 7 includes 360 elements in total. The duty cycle of the first element is 1%; the duty cycle of the second element is 2%, . . . , the duty cycle of the $360^{th}$ element is 360%. According to this method, the optical transceiver 10 can monitor the real-time absolute rotating position of the disc cutter.

There is a reference grating 26 with a fixed cycle of p2 beside the grating hole 22, which is used as a comparison reference to assist in determining an accurate duty cycle and acquiring an accurate rotating angle of the disc cutter. The reference grating 26 can be a through hole or a light transmitting surface or a light scattering surface. Furthermore, another group of optical transceivers 10 are responsible for monitoring the cycle which is compared with that of the grating hole 22 and monitoring the real-time absolute rotating position of the disc cutter.

Embodiment 4

Figure 9:
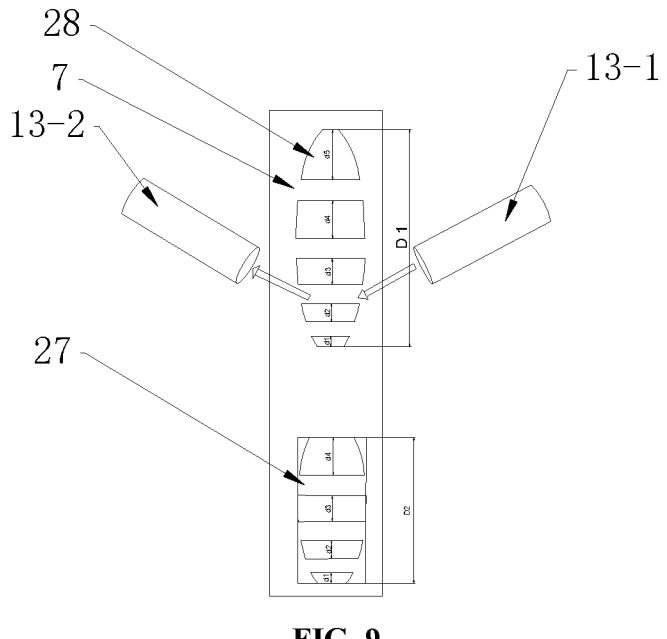
FIG. 9 is a schematic diagram of a ring-shaped grating strip with a composite cycle.

A difference between this embodiment and Embodiment 2 only lies in that, as shown in FIG. 9, the grating holes 22 are periodically distributed along the ring-shaped grating strip 7 as follows.

Multiple large-cycle grating units 27 with unequal distances are arranged on the ring-shaped grating strip 7. Lengths of the large-cycle grating units 27 are respectively D1, D2, . . . , Dn. Different number of small-cycle grating holes 28 are respectively arranged in each large-cycle grating unit 27. Lengths of the small-cycle grating holes 28 are respectively d1, d2, . . . , dn. The small-cycle grating holes 28 are attached in the large-cycle grating units 27. The optical transceiver 10 acquires an accurate rotating position and rotating direction by comparing and analyzing a ratio of the large-cycle grating units 27 to the small-cycle grating holes 28. Other structures, connection relationships and positional relationships are all the same as those in Embodiment 2.

Embodiment 5

Figure 10:
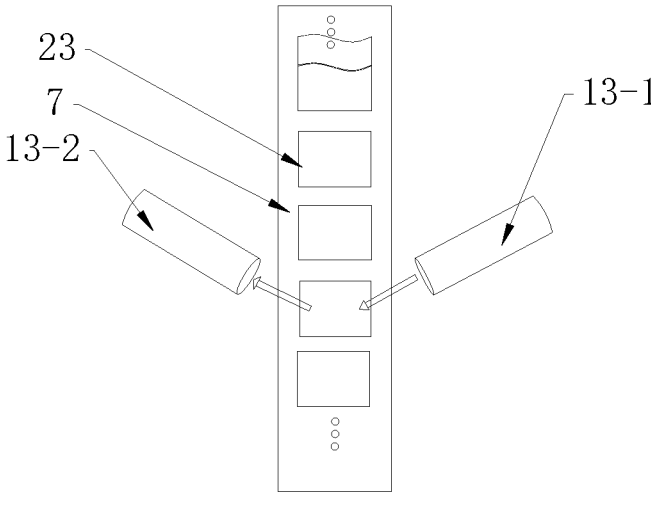
FIG. 10 is a schematic diagram of an arrangement of the ring-shaped grating strip provided with filters.
Figure 11:
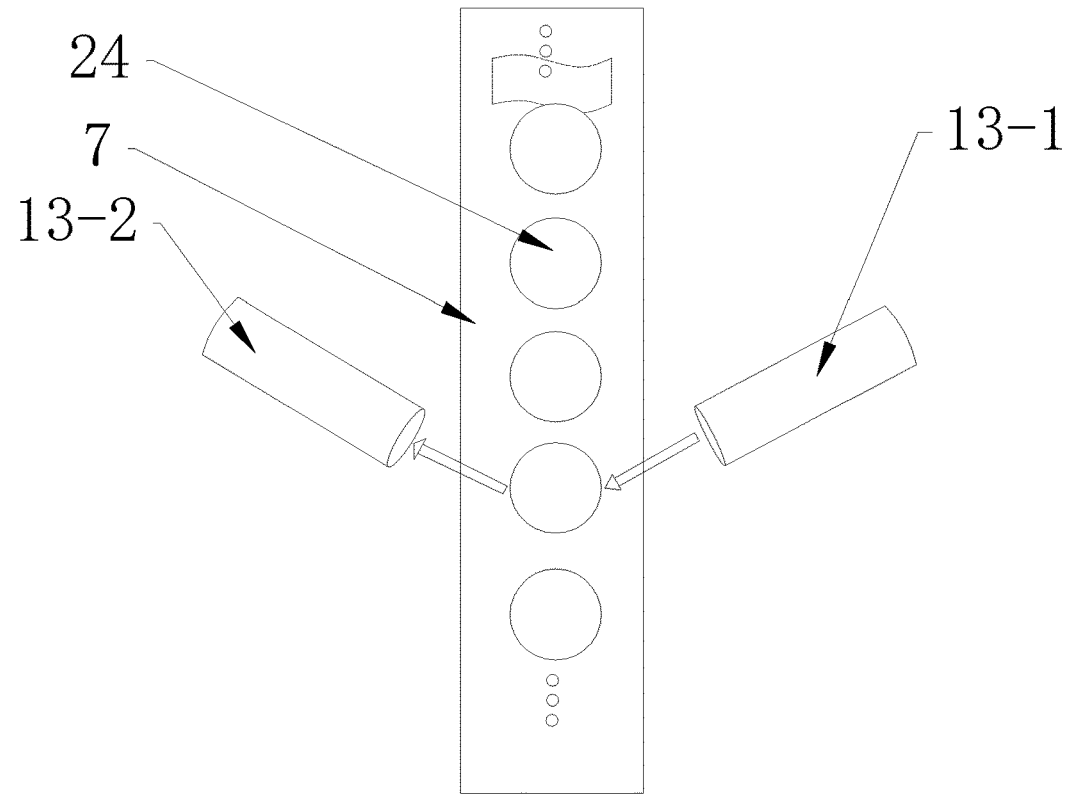
FIG. 11 is a schematic diagram of an arrangement of the ring-shaped grating strip provided with polarizers.
Figure 12:
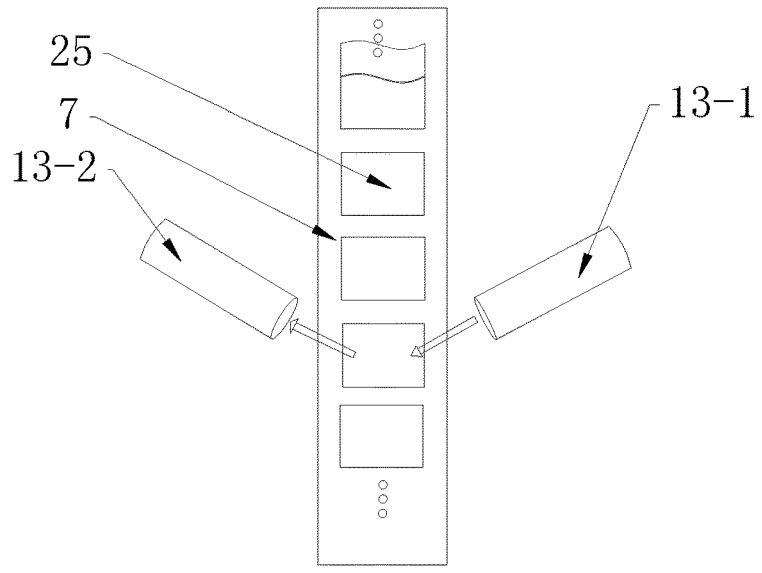
FIG. 12 is a schematic diagram of an arrangement of the ring-shaped grating strip provided with diffraction lenses.
Figure 13:
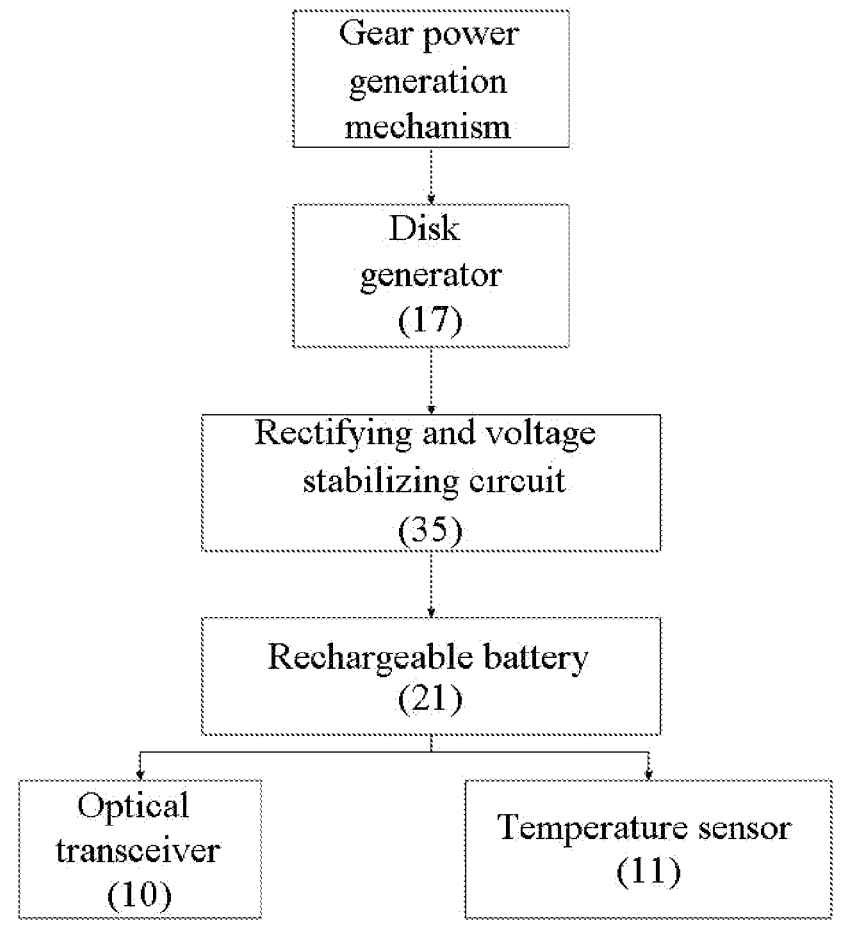
FIG. 13 is a structural block diagram of a geared power generation mechanism.

A difference between this embodiment and Embodiment 1 only lies in that, as shown in FIG. 10, multiple filters 23 with an equal length are arranged on the ring-shaped grating strip 7. The filters 23 are uniformly distributed along the ring-shaped grating strip 7. The optical transceiver 10 monitors the real-time absolute rotating position of the disc cutter according to changes of wavelengths of the filters 23. Other structures, connection relationships and positional relationships are all the same as those in Embodiment 1.

For example, the whole ring-shaped grating strip 7 includes 10 elements in total. The filtering wavelength of the first element is $l_1$; the filtering wavelength of the second element is $l_2$, . . . , the filtering wavelength of the $10^{th}$ element is 110. The optical transceiver 10 monitors the real-time absolute rotating position of the disc cutter. The filter 23 adopts an acrylic plate or the like.

Embodiment 6

A difference between this embodiment and Embodiment 1 only lies in that, as shown in FIG. 10, multiple polarizers 24 are mounted on the ring-shaped grating strip 7. The polarizers 24 are uniformly distributed along the ring-shaped grating strip 7. The polarizers 24 adopt round polarizers with the same diameter. The optical transceiver 10 monitors the real-time absolute rotating position of the disc cutter according to changes of polarizing angles of the polarizers 24. Other structures, connection relationships and positional relationships are all the same as those in Embodiment 1.

For example, the whole ring-shaped grating strip 7 includes 180 elements in total. The polarizing angle of the first element is 1°; the polarizing angle of the second element is 2°, . . . , the polarizing angle of the $180^{th}$ element is 180 ° (when the polarizing angle of linearly polarized light exceeds 180 degrees, for example 181 °, the polarizing angle goes back to 1°). The real-time absolute rotating position of the disc cutter is monitored.

Embodiment 7

A difference between this embodiment and Embodiment 1 only lies in that, as shown in FIG. 10, multiple diffraction lenses 25 are mounted on the ring-shaped grating strip 7. The diffraction lenses 25 are provided with different patterns which are straight lines, circles, rings, and the like. The optical transceiver 10 monitors the real-time absolute rotating position of the disc cutter according to the patterns on the diffraction lenses 25. Other structures, connection relationships and positional relationships are all the same as those in Embodiment 1.

Embodiment 8

Figure 14:
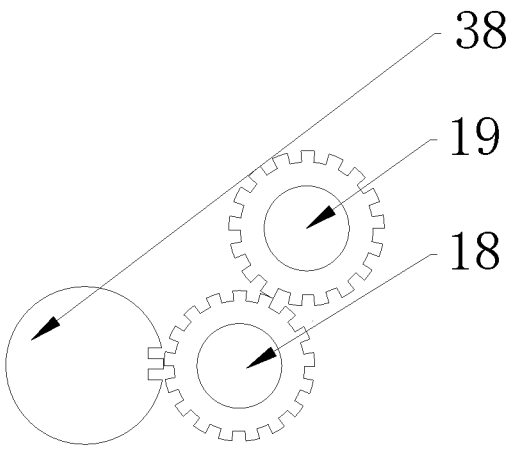
FIG. 14 is a schematic diagram of a structure of a power generation mechanism located at a position on a back of a cutterhead, close to an excavation chamber.

A difference between this embodiment and Embodiment 1 only lies in that, as shown in FIG. 14, the power generation mechanism is mounted on a rear side of a rotating cutter-head. The power generation mechanism includes a disk generator 17 and a geared power generation mechanism. The geared power generation mechanism includes a power generation transmission gear 18 and a power generation speed-increasing gear 19. A gear ring 38 is mounted on an outer race 29 of a rotating bearing where the rotating cutterhead is connected with an excavation chamber. The power generation transmission gear 18 is engaged with the gear ring 38 and the power generation speed-increasing gear 19 respectively. The power generation speed-increasing gear 19 is connected to an input end of the disk generator 17. The disk generator 17 is electrically connected with a rechargeable battery 21 through a rectifying and voltage stabilizing circuit 35. The rechargeable battery 21 is electrically connected with the temperature sensor 11 and the optical transceiver 10 through the power line 15. The optical transceiver 10 is mounted at back of the rotating cutterhead. The rotating cutterhead and a rotating cutterhead holder are welded with a sealed steel tube channel. The optical fiber and a cable are arranged below the disc cutter and are led to a position on the rear side of the rotating cutterhead close to the excavation chamber along the sealed steel tube channel. A signal in the optical fibers is converted into a wireless signal for transmission; the wireless signal is then received at a rear part of the excavation chamber, and is converted into a wired signal and sent to the server for data processing. Other structures, connection relationships and positional relationships are all the same as those in Embodiment 1.

Embodiment 9

Figure 15:
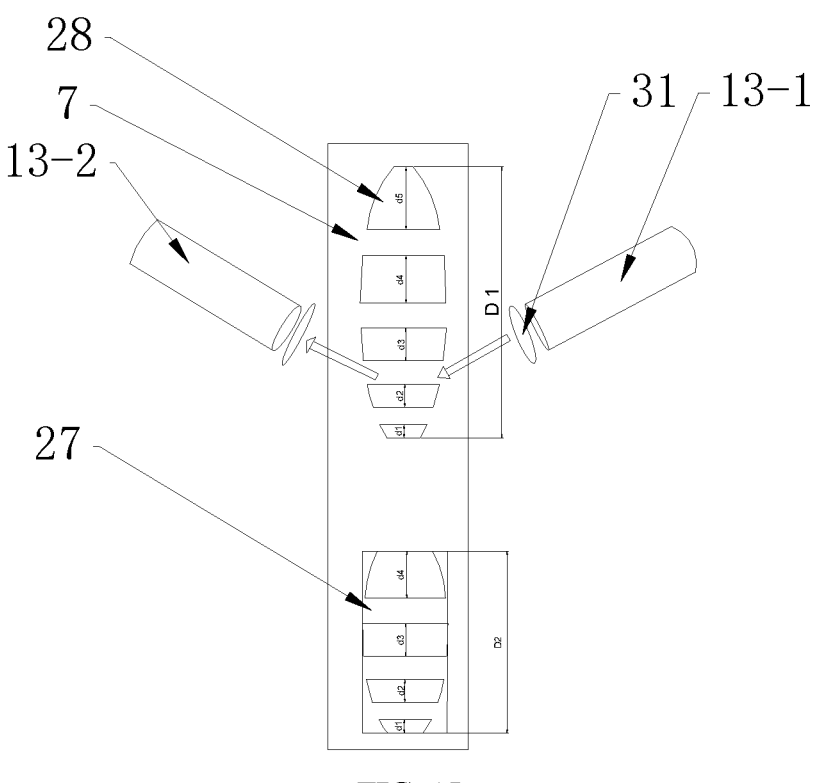
FIG. 15 is a schematic structural diagram of a transmitting optical fiber and a receiving optical fiber, provided with focusing lenses, of the ring-shaped grating strip with a composite cycle.
Figure 16:
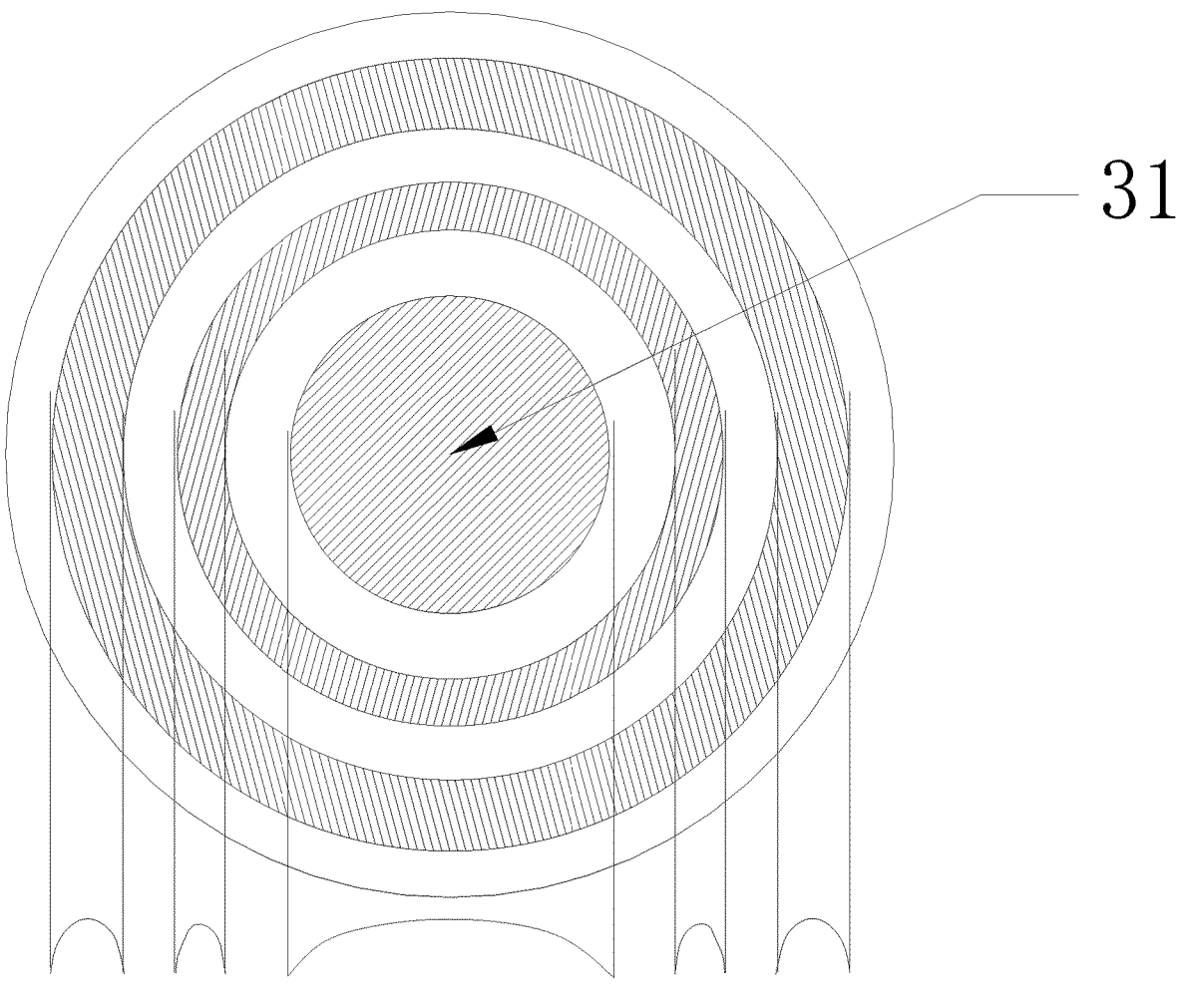
FIG. 16 is a schematic diagram of the focusing lenses.

A difference between this embodiment and Embodiment 3 only lies in that, as shown in FIG. 15 and FIG. 16, focusing lenses 31 are respectively mounted on ends, close to the ring-shaped grating strip 7, of the transmitting optical fiber 13-1 and the receiving optical fiber 13-2. The focusing lenses 31 adopt three-primary-color (RGB) fiber circular focusing lenses to focus light with different wavelengths at different positions, which improves the detection accuracy of the ring-shaped grating strip and avoids the influence caused by relative vibrations of parts in a pipeline.

The three-primary-color (RGB) fiber annular focusing lens allows RGB light to pass through and focus on different spatial positions by means of coating, material absorption, a waveguide structure thickness, NA value change or micro cavity interference. When the receiving optical fiber and the transmitting optical fiber in the hob body move relative to the ring-shaped grating strip due to an external vibration, a transmitting point transmits light with colors back to the receiving optical fiber and the transmitting optical fiber, and the rotating speed and the vibration of the disc cutter are calculated at the same time. Other structures, connection relationships and positional relationships are all the same as those in Embodiment 3.

Embodiment 10

Figure 17:
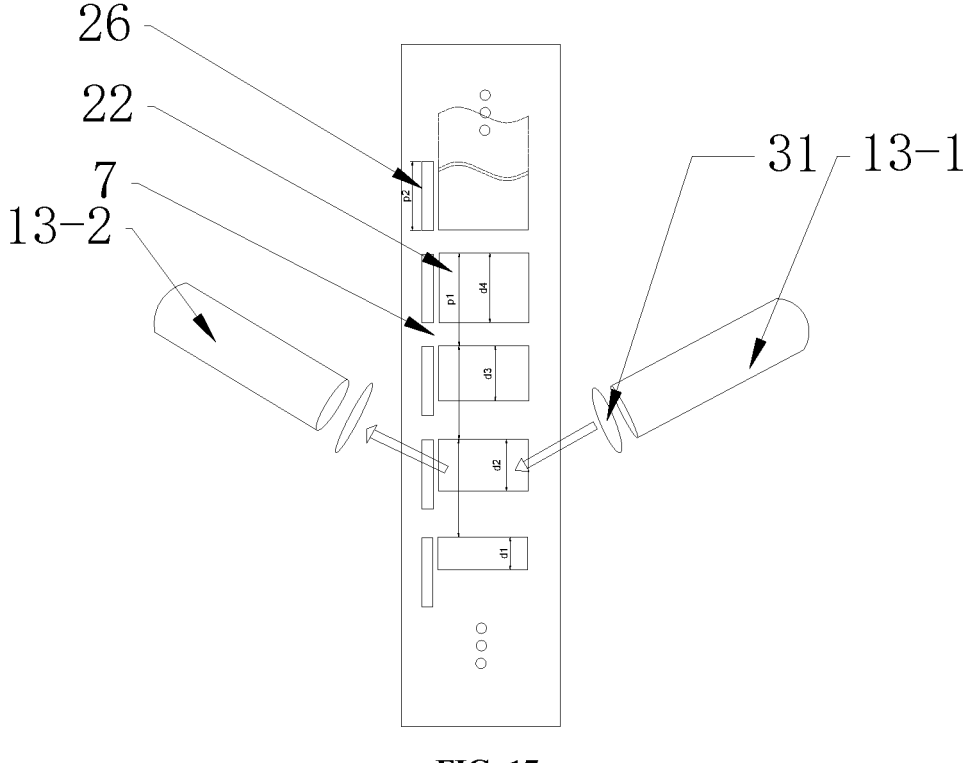
FIG. 17 is a schematic structural diagram of a transmitting optical fiber and a receiving optical fiber, provided with focusing lenses, of the ring-shaped grating strip with a gradually changing duty cycle.
Figure 18:
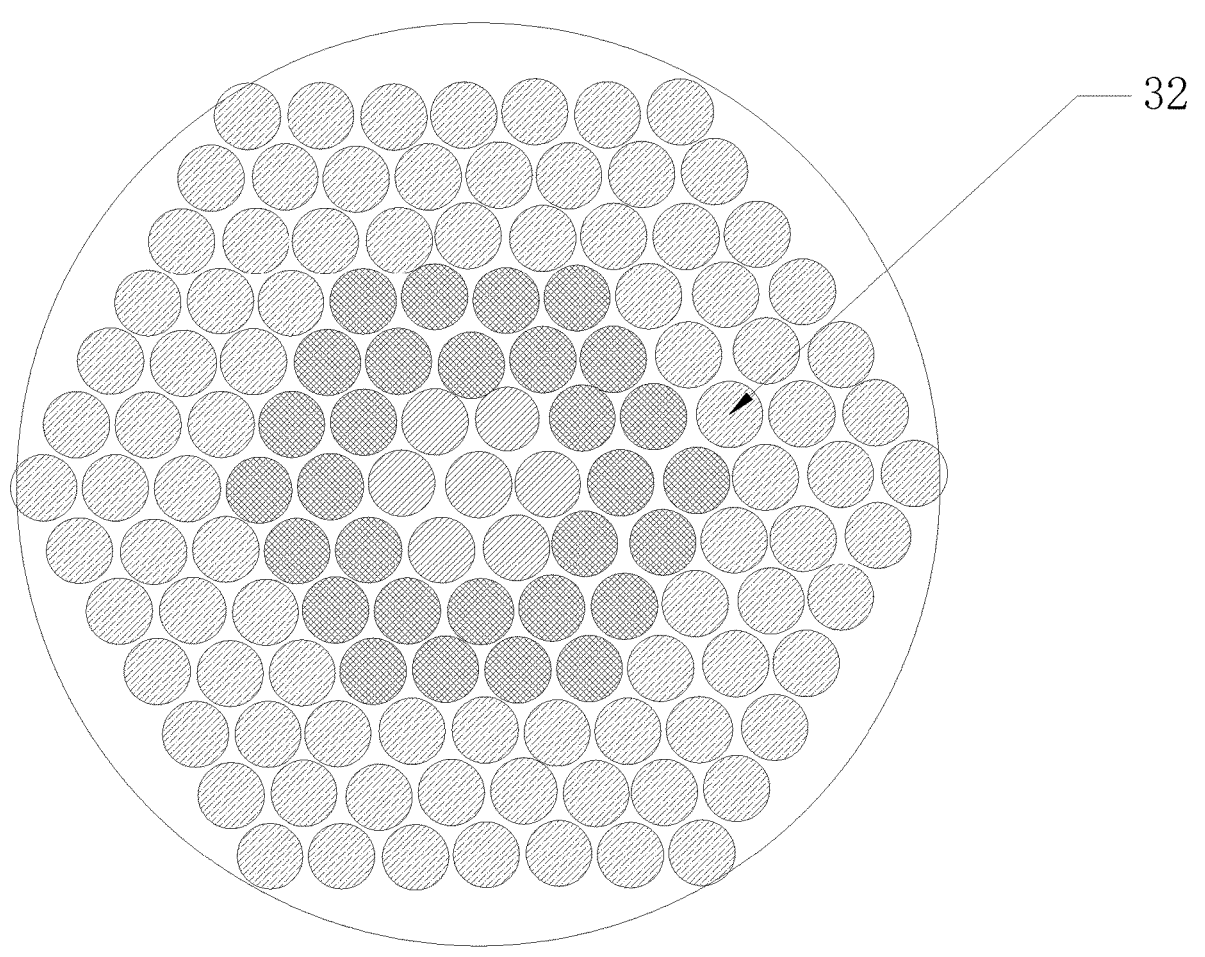
FIG. 18 is a schematic diagram of an NA-gradient multi-beam fiber.

A difference between this embodiment and Embodiment 4 only lies in that, as shown in FIG. 17, focusing lenses 31 are respectively mounted on sides, close to the ring-shaped grating strip 7, of the transmitting optical fiber 13-1 and the receiving optical fiber 13-2. The focusing lenses 31 adopt three-primary-color (RGB) fiber circular focusing lenses to focus lights with different wavelengths at different positions, so as to improve the detection accuracy of the ring-shaped grating strip and avoid the influence caused by relative vibrations of parts in a pipeline.

The three-primary-color (RGB) fiber annular focusing lens allows light beams with different wavelengths to pass therethrough by means of coating, material absorption, a waveguide structure thickness, Numerical Aperture (NA) value change or micro cavity interference. when the receiving optical fiber and the transmitting optical fiber in the disc cutter body move relative to the ring-shaped grating strip due to an external vibration, a transmitting point transmits light with different colors back to the receiving optical fiber and the transmitting optical fiber, and a rotating speed and vibration of the disc cutter are calculated at the same time. Other structures, connection relationships and positional relationships are all the same as those in Embodiment 4.

Embodiment 11

A difference between this embodiment and Embodiment 1 only lies in that, as shown in FIG. 17, both the transmitting optical fiber 13-1 and the receiving optical fiber 13-2 adopt a NA-gradient multi-beam fiber 32. The NA-gradient multi-beam fiber 32 refers to a multi-beam fiber in which an NA value increases or decreases gradually ring by ring along an outward radial direction of a light propagation direction, that is, the NA-gradient multi-beam fiber means that for multiple parallel optical fibers, NA value of an optical fiber on an outer ring is greater than that of an optical fiber on an inner ring. The NA-gradient multi-beam fiber 32 includes an optical fiber for transmitting red light, an optical fiber for transmitting green light and an optical fiber for transmitting blue light from inside to outside. The NA of the optical fiber for transmitting red light located in the center of the NA-gradient multi-beam fiber 32 is the smallest (such as NA=0.15), which is relatively close to that of parallel light. The NA of the optical fiber for transmitting green light is intermediate (such as NA=0.2). The NA of the optical fiber for transmitting blue light is the largest (such as NA=0.25). The larger the NA value, the larger the divergence angle of the optical fiber, and the shorter the focal length after focusing. Therefore, red light, green light and blue light are respectively injected into the optical fiber for transmitting red light, the optical fiber for transmitting green light and the optical fiber for transmitting blue light, so that the light with different wavelengths are focused at different focal points, and the rotating speed and vibration of the disc cutter body are calculated.

Embodiment 12

Figure 19:
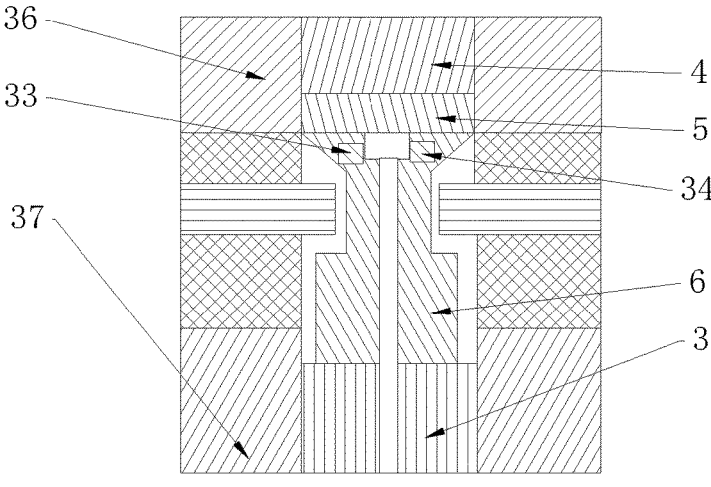
FIG. 19 is a schematic structural diagram of Embodiment 12.

A difference between this embodiment and Embodiment 1 only lies in that, as shown in FIG. 19, the rotator 5 is in tight fit with the isolation boss 4 or a bearing end cover 36, and the bearing spacer 3 is in fit with a bearing inner race 37. Other structures, connection relationships and positional relationships are all the same as those in Embodiment 1.

Embodiment 13

A difference between this embodiment and Embodiment 1 only lies in that, a left seal 33 and a right seal 34 are mounted between the T-shaped extension support 6 and the rotator 5 at bilateral sides of the rotator. Both the left seal 33 and the right seal 34 adopt rubber seals. Or, a left bearing and a right bearing are mounted between the T-shaped extension support 6 and the rotator 5. Other structures, connection relationships and positional relationships are all the same as those in Embodiment 1.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A performance monitoring system for a disc cutter of a tunnel boring machine (TBM), comprising:
   an optical transceiver, a temperature sensor, a disc cutter body, a shaft assembly and an isolation boss, wherein the shaft assembly comprises a shaft main body and a bearing spacer located on the shaft main body;
   a rotating mechanism arranged in a space between the isolation boss and the bearing spacer;
   wherein the rotating mechanism comprises:
   a rotator and a T-shaped extension support located between the bearing spacer and the rotator;
   a plurality of bearing retainers having roller bearings arranged on two sides of the T-shaped extension support;
   a ring-shaped grating strip arranged on a side part of the rotator close to the T-shaped extension support;
   wherein the isolation boss is arranged on an other side part of the rotator away from the shaft assembly;
   wherein the isolation boss is linked with the rotator; and
   a sealing assembly is arranged between the T-shaped extension support and the rotator at bilateral sides of the rotator;
   a bearing spacer hole is formed in the bearing spacer and has transmitting and receiving optical fibers connected with the optical transceiver and a probe of the temperature sensor arranged therein;
   the system configured such that when the disc cutter body rotates the grating strip is driven to rotate by the isolation boss to chop a light beam emitted from the optical fibers embedded in the T-shaped extension support based on relative motion between the bearing spacer and the isolation boss;

the system configured such that the light beam is reflected back to the optical fibers by a non-hollowed portion of the grating strip and then transmitted to the optical transceiver, to acquire a pulsed signal carrying a positioning feature, and in turn obtain a rotating speed, a rotating direction, an angular acceleration and a vibration frequency of the disc cutter.

2. The performance monitoring system for the disc cutter of the TBM according to claim 1, further comprising:

a pipeline passage hole formed in the shaft main body, the pipeline passage hole in communication with the bearing spacer hole, and the pipeline passage hole comprising the optical fibers, an electronic signal line and a power line mounted therein;

the temperature sensor sends data to a server through the electronic signal line;

the optical transceiver sends data to the server through the optical fibers; and the power line is electrically connected with the temperature sensor for supplying power to the temperature sensor.

3. The performance monitoring system for the disc cutter of the TBM according to claim 1, wherein the system further comprises a disc cutter box and a power generation mechanism arranged in the disc cutter box.

4. The performance monitoring system for the disc cutter of the TBM according to claim 3, wherein the power generation mechanism comprises a disk generator and a geared power generation mechanism;

the geared power generation mechanism comprises a power generation transmission gear and a power generation speed-increasing gear;

a disc cutter body transmission gear arranged on the disc cutter body;

the power generation transmission gear engaged with the disc cutter body transmission gear and the power generation speed-increasing gear;

the power generation speed-increasing gear coupled to an input end of the disk generator;

the disk generator electrically coupled with a rechargeable battery through a rectifying and voltage stabilizing circuit;

the rechargeable battery electrically coupled with the temperature sensor and the optical transceiver through the power line; and the optical transceiver arranged in the disc cutter box.

5. The performance monitoring system for the disc cutter of the TBM according to claim 1, further comprising a power generation mechanism arranged on a rear side of a rotating cutterhead, and wherein the power generation mechanism comprises:

a disk generator and a geared power generation mechanism, wherein the geared power generation mechanism comprises a power generation transmission gear and a power generation speed-increasing gear;

a gear ring arranged on an outer race of a rotating bearing where the rotating cutterhead couples with an excavation chamber;

wherein the power generation transmission gear engages the gear ring and the power generation speed-increasing gear;

the power generation speed-increasing gear coupled to an input end of the disk generator;

the disk generator electrically coupled with a rechargeable battery through a rectifying and voltage stabilizing circuit;

the rechargeable battery coupled with the temperature sensor and the optical transceiver through a power line; and the optical transceiver is arranged at a back of the rotating cutterhead.

6. The performance monitoring system for the disc cutter of the TBM according to claim 5, wherein the rotating cutterhead and a rotating cutterhead holder are welded with a sealed steel tube channel;

the optical fibers and a cable are arranged below the disc cutter and led to a position on the rear side of the rotating cutterhead close to the excavation chamber along the sealed steel tube channel;

a signal in the optical fibers is converted into a wireless signal for transmission;

the wireless signal is received at a rear part of the excavation chamber and is converted into a wired signal and sent to the server for data processing.

7. The performance monitoring system for the disc cutter of the TBM according to claim 1, wherein a plurality grating holes are arranged on the ring-shaped grating strip;

the rotating speed of the disc cutter body is acquired periodically according to a distance between adjacent grating holes and a cycle of a reflected light signal, with intensity of the reflected light signal modulated by the grating strip;

a rotating acceleration is acquired according to a variation of the rotating speed of the disc cutter body with respect to time; and a vibration frequency signal is obtained by deriving Fourier transformation on the pulsed light signal over time.

8. The performance monitoring system for the disc cutter of the TBM according to claim 7, wherein the grating holes are distributed along the grating strip, and arranged with an equal interval and an equal length.

9. The performance monitoring system for the disc cutter of the TBM according to claim 7, wherein the plurality of grating holes are distributed along the grating strip;

lengths of the grating holes are respectively d1, d2, . . . , dn, and the grating holes are different in length;

a distance between an upper edge of any grating hole and an upper edge of an adjacent next grating hole is equal, which is p1;

a reference grating with a fixed length is arranged on a side of each grating hole;

lengths of all reference gratings are all equal, which are p2, and a calculation formula of a duty cycle sn is as follows:

$$sn = \frac{p2 - dn}{p2};$$

a cycle is monitored by the optical transceiver, and compared with a cycle of the reference grating;

a real-time absolute rotating position of the disc cutter is monitored in combination with the duty cycle;

an accurate rotating angle of the disc cutter is acquired by using the reference grating as a comparison reference, and the reference grating adopts a reference grating hole or a light reflection surface or a light diffusion surface or a scattering surface.

10. The performance monitoring system for the disc cutter of the TBM according to claim 7, wherein the grating holes are periodically distributed along the grating strip:

a plurality of large-cycle grating units with unequal distances are arranged on the ring-shaped strip, wherein lengths of the large-cycle grating units are respectively D1, D2, . . . , Dn;

a different number of small-cycle grating holes are respectively arranged in each large-cycle grating unit, wherein lengths of the small-cycle grating holes are respectively d1, d2, . . . , dn;

the small-cycle grating holes are attached in the large-cycle grating units; and the optical transceiver acquires an accurate rotating position and the rotating direction by comparing and analyzing a ratio of the large-cycle grating units to the small-cycle grating holes.

11. The performance monitoring system for the disc cutter of the TBM according to claim 1, wherein a plurality of filters with an equal length are arranged on the grating strip, wherein the filters are uniformly distributed along the grating strip and the optical transceiver monitors a real-time absolute rotating position of the disc cutter according to a change of wavelengths of the filters.

12. The performance monitoring system for the disc cutter of the TBM according to claim 1, wherein a plurality of polarizers are arranged on the grating strip, wherein the polarizers are uniformly distributed along the grating strip and have a same size and the optical transceiver monitors a real-time absolute rotating position of the disc cutter according to a change of polarizing angles of the polarizers.

13. The performance monitoring system for the disc cutter of the TBM according to claim 1, wherein a plurality of diffraction lenses are arranged on the grating strip, wherein the diffraction lenses are provided with different patterns and the optical transceiver monitors a real-time absolute rotating position of the disc cutter according to the patterns on the diffraction lenses.

14. The performance monitoring system for the disc cutter of the TBM according to claim 1, wherein a transmitting optical fiber and a receiving optical fiber are mounted on a same side of the ring-shaped grating strip.

15. The performance monitoring system for the disc cutter of the TBM according to claim 14, wherein a plurality of focusing lenses are respectively arranged on ends, close to the grating strip, of the transmitting optical fiber and the receiving optical fiber.

16. The performance monitoring system for the disc cutter of the TBM according to claim 15, wherein the plurality focusing lenses adopt dispersive fiber circular focusing lenses to focus light with different wavelengths at different positions, improving detection accuracy of the ring-shaped grating strip;

the dispersive fiber circular focusing lenses allowing light beams with different wavelengths to pass therethrough by means of coating, material absorption, a waveguide structure thickness, Numerical Aperture (NA) value change or micro cavity interference, and focuses the light beams to different spatial positions;

the system configured such that when the receiving optical fiber and the transmitting optical fiber in the disc cutter body move relative to the ring-shaped grating strip due to an external vibration, a transmitting point transmits light with different wavelengths back to the receiving optical fiber and the transmitting optical fiber, and the rotating speed and the vibration of the disc cutter are calculated.

17. The performance monitoring system for the disc cutter of the TBM according to claim 14, wherein the receiving optical fiber adopts an NA-gradient multi-beam fiber, wherein the NA-gradient multi-beam fiber is a multi-beam fiber in which an NA value increases or decreases gradually ring-by-ring along an outward radial direction of a light propagation direction, such that for a plurality of parallel optical fibers, NA value of an optical fiber on an outer ring is greater than that of an optical fiber on an inner ring.

18. The performance monitoring system for the disc cutter of the TBM according to claim 17, wherein the NA-gradient multi-beam fiber includes an optical fiber with a wavelength of $\lambda_1$, an optical fiber with a wavelength of $\lambda_2$, and an optical fiber with a wavelength of $\lambda_3$ from inside to outside, $\lambda_1 > \lambda_2 > \lambda_3$.

19. The performance monitoring system for the disc cutter of the TBM according to claim 1, wherein a connecting component is arranged between the rotator and the isolation boss for fixedly connecting the rotator and the isolation boss.

20. The performance monitoring system for the disc cutter of the TBM according to claim 19, wherein the connecting component adopts a connecting fixed rod or a spring pin.

* * * * *